Sept. 8, 1970     R. E. KEMPEN     3,527,229
METHOD AND APPARATUS FOR CARDIAC DEFIBRILLATION
Filed Jan. 5, 1968
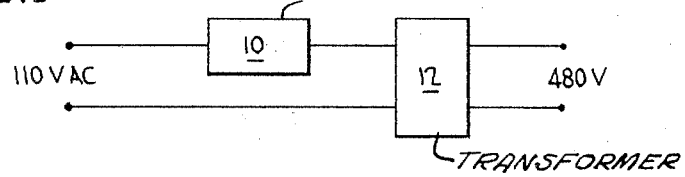
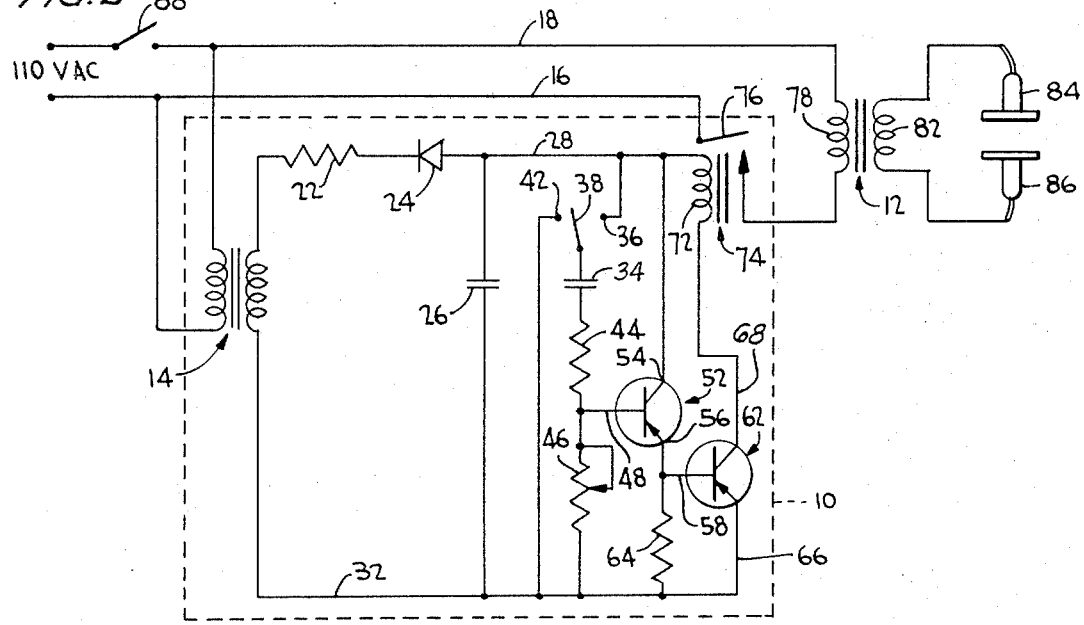
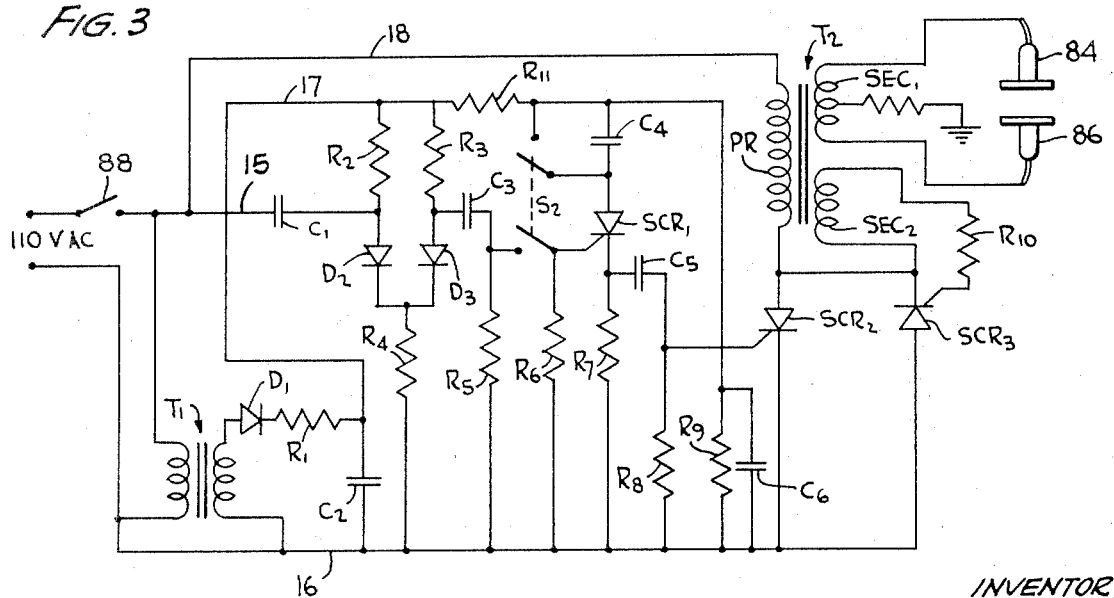
INVENTOR,
RENE R. KEMPEN
BY Jacobi & Davidson
ATTORNEYS United States Patent Office 3,527,229
Patented Sept. 8, 1970

3,527,229
METHOD AND APPARATUS FOR CARDIAC DEFIBRILLATION
Rene R. Kempen, Foundation Apts. D-20,
Galveston, Tex. 77550
Continuation-in-part of application Ser. No. 456,058,
May 17, 1965. This application Jan. 5, 1968, Ser.
No. 696,075
Int. Cl. A61n *1/38*
U.S. Cl. 128—419                                   12 Claims

ABSTRACT OF THE DISCLOSURE

A method and apparatus for cardiac defibrillation wherein as sinusoidal shock pulse of less than 100 milliseconds, and preferably approximately 20 milliseconds, in duration is derived from a single cycle of alternating current either by a manually operated, electronic timer and relay circuit or by an automatic, line voltage- synchronized timer and controlled rectifier circuit.

This application is a continuation-in-part of my copending application Ser. No. 456,058, filed May 17, 1965, now abandoned.

This invention relates to a method and apparatus for cardiac defibrillation and more particularly to a method and apparatus for cardiac defibrillation utilizing an extremely short duration shock pulse preferably derived from a conventional AC source—e.g., a sixty cycle per second alternating current source of approximately 110 volts.

It has long been known that a very strong current flow for a relatively short interval of time through a fibrillating heart muscle can stop the fibrillation. It has therefore been previously proposed to defibrillate a fibrillating cardiac muscle which has been thrown into fibrillation by a physiological shock, an electric shock, or other cause, by means of an electric shock applied either directly, through a surgically opened chest, or indirectly, through an unopened chest.

While it has been recognized that such electrical shocks could be derived from either an alternating current or a direct current power supply, commercially available defibrillation apparatus have been limited almost exclusively to direct current equipment with alternating current defibrillators being thought unsatisfactory. Perhaps the main reason for considering alternating current defibrillators as being commercially unsatisfactory was the fact that such defibrillators were regarded as dangerous for use on human patients. Tests which were run on animals, for example, indicated that alternating current defibrillators tended to induce or initiate both ventricular and atrial defibrillation. Additionally, such AC defibrillators would often cause a burning of the patient's skin.

For the foregoing reasons, alternating current defibillators were largely ignored in the past, and instead, attention was concentrated on direct current defibrillators. However, with direct current defibrillators, it was necessary to provide very high voltages because of the extremely short counter-shocks or pulses produced thereby. To provide such high voltages to thereby produce shocks at the proper level, it was necessary to manufacture a defibrillator which was large, bulky and expensive, due to the size of the power circuitry including the power supplies, capacitors and rectifiers needed to effectively defibrillate a heart. In view of the nature of such direct current defibrillators, it can be appreciated that they were large, expensive, and manufactured to be a permanently positioned heavy equipment item which remained stationary in a doctor's office or a hospital.

In light of the foregoing, it seems clear that the need existed for a lightweight, inexpensive portable form of defibrillator which could be readily transported between different rooms or offices, which could be carried in emergency vehicles, and which was adaptable for almost immediate usage.

These desirable and beneficial features are accomplished in accordance herewith through the use of an alternating current defibrillator, which can be manufactured as a lightweight portable unit that can be plugged directly into a conventional electrical wall outlet thus eliminating the need for a "built in" basic power source. Moreover, the aforesaid disadvantages and dangerous attributes of prior alternating current defibrillators which made them appear to be unsatisfactory from a safety standpoint, are overcome by the present invention.

With the foregoing factors firmly in mind, it is, therefore, a primary object of the present invention to provide a defibrillator which overcomes the difficulties and deficiencies associated with prior art defibrillators, both of the direct current and the alternating current type, and to provide in their stead, an improved method and means for accomplishing cardiac defibrillation.

Another object of the present invention is to provide a safe and satisfactory method for cardiac defibrillation through the use of an alternating current.

Further objects of the present invention are to provide an alternating current cardiac defibrillator which is: (1) easily transportable; (2) inexpensive to produce; (3) small in size and weight; (4) adapted for operation merely by connection to a conventional electrical wall outlet; (5) safe and reliable in operation; and (6) ready for almost immediate usage.

Other objects, advantages and salient features of the present invention will become apparent from the following detailed description, which, taken in conjunction with the annexed drawings, discloses a preferred embodiment thereof.

To understand the essence of the present invention and the manner in which the foregoing objects are attained, it is necessary to recognize that the present invention lies both in the discovery of the reason why prior art alternating current defibrillators were unsatisfactory and then in remedying the unsatisfactory condition. Specifically, prior to the present invention, all persons skilled in the art believed that the minimum time period for an electrical shock duration had to be more than 100 milliseconds, and that if the time period were less than this, a fibrillating cardiac muscle could not be defibrillated. Tests were even conducted which supposedly conclusively proved that a shock pulse had to exceed 100 milliseconds of duration to have any value in accomplishing defibrillation. See, for example, the article entitled "Factors Concerned in Electrical Defibrillation of the Heart," by A. C. Guyton and J. Satterfield, appearing in the American Journal of Physiology, Oct. 1, 1951, pp. 81–87.

However, I discovered that if the time duration of the shock pulse was reduced below 100 milliseconds, and preferably to about 20 milliseconds, not only could effective cardiac defibrillation be accomplished, but additionally, undesirable effects such as initiating ventricular fibrillation, initiating atrial fibrillation and burning of the skin could be substantially eliminated. Thus, as described more fully hereinafter, my invention resides in the method of defibrillating a cardiac muscle through the use of an extremely short duration shock pulse, preferably derived from a sixty cycle per second alternating current source of approximately 110 volts, and also in the means or apparatus for carrying out such a method.

In the drawings:
FIG. 1 is a block diagram of an apparatus suitable for practicing the invention;

FIG. 2 is a schematic diagram of the apparatus shown in block diagram form in FIG. 1; and FIG. 3 is a schematic diagram of an alternative embodiment of an apparatus suitable for practicing the invention.

Referring now to FIG. 1, a cardiac defibrillator constructed in accordance with the instant invention comprises a timer switch 10 to control the application of a line voltage, such as from a 60 cycle per second, 110 volt alternating current power line, to an isolation step-up transformer 12 which preferably supplies an output voltage of approximately 490 volts. The timer switch 10 is preferably designed to provide a pulse of about 20 milliseconds duration, or approximately equal to a single cycle of a 60 cycle per second alernating current. The timer switch 10 may be manually operated or it may be automatically operated by a signal derived from the subject heart, such as the so-called "R wave" of an electrocardiogram and delayed from such R wave a time period such as to place the shock in any desired portion of the cardiac cycle.

The use of such a short 20 millisecond countershock is advantageous with regard to safety conditions in that it will fibrillate a ventricle, that of a dog, for example, only when applied during the vulnerable period and with a voltage between 80±26 volts, R.M.S., and 322±67 volts, R.M.S. The vulnerable period is that portion of the cardiac cycle where a single pulse applied to the ventricle can initiate ventricular fibrillation. The short shocks from direct current defibrillators will also fibrillate the ventricle under these same conditions. However, as aforesaid, an alternating current defibrillator is far more versatile and desirable than a direct current defibrillator since the voltage range of direct current defibrillators is much larger and changes with the time constant of the counter-shock. Also, very high voltages are needed with direct current defibrillators because of the extremely short counter-shocks they produce.

Short duration alternating current counter-shocks, such as those produced during the aforesaid 20 millisecond period, are also effective against atrial fibrillation. On the other hand, long duration alternating current counter-shocks, that is, counter-shocks having a duration of 120 milliseconds or more, are not only ineffective against atrial fibrillation, but, in fact, tend to initiate such atrial fibrillation, if the voltage is, for example, in the range of 30 to 480 volts, R.M.S.

While shocks of approximately 20 milliseconds have been found to produce the best results, shocks of less than 100 milliseconds can be used advantageously in some instances, with shocks of less than 50 milliseconds having highly beneficial effects, and with shocks of between 10 and 30 milliseconds producing advantages of generally the same order as the 20 millisecond pulses.

Referring now to FIG. 2, there is shown a schematic diagram of a defibrillator suitable for use in the practice of this invention. The timer switch 10 is shown within the dashed line box and comprises a low voltage transformer 14 connected across the supply lines 16 and 18, a resistor 22, a rectifier 24, and a filter capacitor 26 to supply a low voltage direct current operating voltage for the timer switch 10 i.e., a negative voltage appearing on a conductor 28 and a positive voltage on a conductor 32. This voltage difference is preferably in the range of 12–16 volts, but other suitable voltages may be used.

The timer switch 10 is activated by connecting one side of a timing capacitor 34 to the negative conductor 28 through one terminal 36 of a double throw switch 38. The other terminal 42 of the double throw switch 38 alternatively connects said one side of the capacitor 34 to the positive conductor 32. The other side of the timing capacitor 34 is connected to the positive conductor 32 through a resistor 44 and a timing resistor 46, resistors 44 and 46 being connected in series with the timing capacitor 34. As shown, the timing resistor 46 is preferably adjustable so that the time duration of the defibrillating shock may be adjusted.

The base 48 of a transistor 52, which is preferably of the PNP type, and operatively connected to function as an amplifier, is connected between the resistors 44 and 46. The collector 54 of the transistor 52 is connected to the negative conductor 28 and the emitter 56 of the transistor 52 is connected to the base 58 of a transistor 62, preferably of the PNP type and likewise operatively connected to function as an amplifier. The base 58 is also connected to the positive conductor 32 through a biasing resistor 64. The emitter 66 of the transistor 62 is connected to the positive conductor 32 and the collector 68 of the transistor 62 is connected to the negative conductor 28 through the operating coil 72 of a relay 74.

The contacts 76 of the relay 74 connect the 110 volt, 60 cycle per second alternating current supply lines 16 and 18 to the primary winding 78 of an output transformer 12. The output winding 82 of the output transformer 12 is utilized to supply the defibrillating pulse to a pair of electrodes 84 and 86 for application to the subject.

An on-off switch 88 is provided to deactivate the entire apparatus during non-use thereof.

As examples only, and without any intent of limiting this disclosure thereby, values of the various components which have been found effective in actual practice are as follows.

Transformers:
    12—110 volt input, 480 volt output at .5 kva.
    14—110 volt input, 12.6 volt output at 2 amps
Resistor 22—10 ohms
Rectifier 24—type 1N253
Capacitors:
    26—1000 mfd., 25 volts
    34—25 mfd., 15 volts
Resistors:
    44—220 ohms
    46—100 ohms
    64—1000 ohms
Relay 74—12 volt, 20 amp contacts.

In operation, the defibrillator is actuated by closing the switch 38 to terminal 36 to connect the capacitor 34 to the negative conductor 28. This causes the transistor 52 to immediately become conductive and consequently causes the transistor 62 to saturate. Since the relay 74 is the collector circuit of the transistor 62, the relay is closed thereby to connect the power supply lines 16 and 18 to the primary winding 78 of the output transformer 12. The time that the relay 74 remains closed depends upon the time constant of the capacitor 34, the resistors 44 and 46, and the base resistance of the transistor 52. The resistor 46 is preferably adjusted to provide for a 20 millisecond period of closure of the relay 74, but in no event should such relay closure exceed 100 milliseconds as indicated above.

As the capacitor 34 charges, it decreases the current flow through the emitter 56 of the transistor 52. When the current decreases sufficiently, the transistor 62 will be cut-off thereby de-energizing the relay 74. The timer switch 10 must then be reset by discharging the capacitor 34 through the switch terminal 42 of the switch 38 before a second pulse may be delivered. The system hereof thus operates on "charging time" rather than a "discharge time" thus additionally permitting more accurate control and facilitating the use of a conventional AC basic power supply.

Although the above-described defibrillator apparatus has been found to be quite effective in actual operation, in that the duration of the shock pulse is controlled, it is not always possible to synchronize the time duration with the line current. Thus, the wave shape or form of the shock pulse will vary depending upon when the timer switch 10 closed in relation to the instantaneous line voltage. In some defibrillating applications, however, it is desirable to ensure that the shock pulse applied to the cardiac area is not only of the desired short duration, but that the duration itself is synchronized with the main line power supply. In this manner, the wave shape or form of each shock pulse applied to the cardiac area would be fixed, and would comprise a wave shape always commencing at a predetermined instantaneous value or point. Such synchronization would afford a greater degree of accuracy and control in the defibrillation process. An alternative embodiment of a cardiac defibrillator constructed in accordance with the instant invention which offers these additional advantages derived from synchronous operation with the line current, is depicted in FIG. 3 of the drawings.

Referring now to FIG. 3, it is seen that the general configuration of this alternative embodiment of the inventive apparatus is quite similar to the embodiment of FIG. 2 in that a source of alternating line current preferably of 60 cycles per second and of 110 volts, for example, is applied on conductors 18 and 16 to the primary winding PR of step-up transformer $T_2$ through a timing switch. The timing switch comprises a pair of controlled rectifiers $SCR_2$ and $SCR_3$ connected in inverse-parallel relationship, the controlled rectifiers performing the same basic function as the relay contact 76 of the embodiment of FIG. 2, in that current will be applied to the primary winding PR of transformer $T_2$ only when one or the other of the controlled rectifiers are conductive. Controlled rectifiers $SCR_2$ and $SCR_3$ may, for example, comprise silicon controlled rectifiers thus affording the advantages inherent with semi-conductive circuit components. Transformer $T_2$ includes a secondary winding $SEC_1$ which produces a voltage pulse of approximately 480 volts across electrodes 84 and 86 which apply the pulse to the cardiac area of a patient.

Novel timing circuitry is provided to control the duration and time of commencement of the conducting intervals of the controlled rectifiers $SCR_2$ and $SCR_3$ such that each shock or pulse applied across secondary winding $SEC_1$ of transformer $T_2$ to the electrodes 84 and 86 occurs in synchronism with the line current. The timing circuitry in its conceptual form, preferably comprises a square wave generator means for producing asymmetrical square waves from the line current, a differentiating means for producing phase shifted pulses from the asymmetrical square waves, and a triggering means for producing a single triggering signal for the controlled rectifiers $SCR_2$ and $SCR_3$ from the phase shifted pulses.

Tracing the schematic diagram of FIG. 3, the square wave generator means of the timing circuitry is seen to include a transformer $T_1$, the primary winding of which is connected across the source of alternating line current. The secondary winding of transformer $T_1$ is connected through a diode $D_1$ and a resistor $R_1$ to a capacitor $C_2$. The terminals of capacitor $C_2$ are respectively connected to conductors 16 and 17. A series circuit branch comprising resistor $R_2$, diode $D_2$ and resistor $R_4$ is connected across terminals 16 and 17 and a further series circuit branch comprising resistor $R_3$ and diode $D_3$ is connected in parallel across resistor $R_2$ and diode $D_2$. A conductor 15 brings in the alternating line voltage through a coupling capacitor $C_1$ to the junction between resistor $R_2$ and the anode of diode $D_2$.

A differentiating circuit may be connected between the junction of resistor $R_3$ with the anode of diode $D_3$ and conductor 16, and preferably comprises the simple series combination of a capacitor $C_3$ with a resistor $R_5$.

The triggering means of the timing circuitry includes a voltage dropping circuit comprising resistors $R_{11}$ and $R_9$ connected between conductors 16 and 17. A further controlled rectifier $SCR_1$ which may likewise comprise a semi-conductor component such as a silicon controlled rectifier, is connected between the junction of resistors $R_{11}$ and $R_9$ through capacitor $C_4$ connected to the anode thereof and conductor 16 by resistor $R_7$ connected to the cathode. A further resistor $R_6$ also connects the gate or trigger electrode of $SCR_1$ to conductor 16. A double pole-double throw switch $S_2$ is operative, in a reset position thereof to both short-out capacitor $C_4$ and to open a circuit connection between the gate electrode of controlled rectifier $SCR_1$ and the junction of capacitor $C_3$ with resistor $R_5$. Switch $S_2$, in a set position thereof, is effective to remove the short circuit across capacitor $C_4$ and, at the same time, to close a circuit connection between the gate or trigger electrode of controlled rectifier $SCR_1$ with the junction of capacitor $C_3$ and resistor $R_5$ of the differentiating circuit.

Capacitor $C_5$ and resistor $R_8$ form a series circuit which is seen to be connected in parallel across resistor $R_7$. The gate or trigger electrode of the controlled switching rectifier $SCR_2$ is connected to the junction of capacitor $C_5$ and resistor $R_8$ while the gate or trigger electrode of the controlled switching rectifier $SCR_3$ is connected to its own cathode through resistor $R_{10}$ and a further secondary winding $SEC_2$ of transformer $T_2$. Finally, a capacitor $C_6$ may be placed in parallel with resistor $R_9$.

As examples only, and again without any intent or limiting this disclosure thereby, values of the various components utilized in the embodiment of the defibrillator depicted in FIG. 3 which have been found suitable in actual practice are as follows.

Transformers:
    $T_1$—Stanchor P8130
    $T_2$—Matteson P-432
Diodes:
    $D_1$—1N1124
    $D_2$—150MA 400PIV
    $D_3$—150MA 400PIV
Controlled rectifiers:
    $SCR_1$—GEC6A
    $SCR_2$—2N3898 RCA
    $SCR_3$—2N3898 RCA
Resistors:
    $R_1$—100 ohms
    $R_2$—100K ohms
    $R_3$—27K ohms
    $R_4$—33K ohms
    $R_5$—10K ohms
    $R_6$—10K ohms
    $R_7$—100 ohms
    $R_8$—1K ohms
    $R_9$—680 ohms
    $R_{10}$—3.9K ohms
    $R_{11}$—470 ohms
Capacitors:
    $C_1$—.25 microfarad
    $C_2$—500 microfarads
    $C_3$—.02 microfarad
    $C_4$—300 microfarads
    $C_5$—.02 microfarad
    $C_6$—100 microfarads.

In operation, switch $S_2$ is normally placed in the position wherein capacitor $C_4$ is shorted out and the circuit connection between the gate or trigger electrode of controlled rectifier $SCR_1$ with the junction of capacitor $C_3$ and resistor $R_5$ is open. The timing circuitry including diodes $D_1$ and $D_2$ is effective to clip the waveform of the incoming alternating line current in an asymmetrical manner such that an asymmetrical square wave is produced at the junction of resistor $R_3$ with diode $D_3$. This asymmetrical square wave is applied to the differentiating circuit comprising capacitor $C_3$ and resistor $R_5$ which will produce a train of positive and negative pulses at the junction between capacitor $C_3$ and resistor $R_5$. This train of positive and negative pulses are, by virtue of the asymmetrical square wave applied to the differentiating circuit, delayed in phase with respect to the phase of the alternating line current.

When a defibrillating pulse is desired to be produced, double-pole, double-throw switch $S_2$ is placed into its alternative position wherein the short circuit across capacitor $C_4$ is disconnected and wherein the gate or trigger electrode of controlled rectifier $SCR_1$ is connected to the source of delayed in phase pulses appearing at the junction between capacitor $C_3$ and resistor $R_5$. Controlled rectifier $SCR_1$ will be caused to "fire," that is to become conductive upon the arrival of the first positive going pulse at the trigger electrode thereof. Controlled rectifier $SCR_1$ because of the connection of capacitor $C_4$, will then pass one surge or pulse of current through resistor $R_7$ to the conductor 16. The single surge of current flowing in resistor $R_7$ produces a corresponding voltage spike which is transmitted through the connection of capacitor $C_5$ and resistor $R_8$ to the gate or trigger electrode of controlled rectifier $SCR_2$. This voltage spike will likewise be phase shifted with respect to the alternating line current, one half cycle of which will now pass through $SCR_2$ and transformer primary PR, such that the inherent time delay or lag in the main line current flow effected by the connection of a load across secondary $SEC_1$ of transformer $T_2$ will be essentially compensated for or negated. Thus, controlled rectifier $SCR_2$ will be made conductive at a time when a complete cycle of alternating current across conductors 16 and 18 is just commencing and will conduct the first half cycle of alternating line current through the primary PR of transformer $T_2$.

When the first half cycle of line current is applied to the primary winding PR, a magnified one half cycle defibrillating pulse will be applied across secondary winding $SEC_1$ and thus to electrodes 84 and 86. An induced voltage pulse will also be produced in secondary winding $SEC_2$ by virtue of the magnetic coupling thereof. This induced pulse in secondary winding $SEC_2$ is effective to trigger and make conductive controlled rectifier $SCR_3$ at a time when the line current applied across conductors 16 and 18 enters the second half cycle of the alternating current waveform. Accordingly, controlled rectifier $SCR_3$ will pass the second half cycle of line current through the primary winding PR and thus, there appears across the secondary winding $SEC_1$ of transformer $T_2$, a complete cycle of alternating current, raised in voltage with respect to the line voltage applied, but produced in absolute synchronism with the line current. The defibrillating pulse will comprise only one complete cycle of the line current commencing at a zero crossover point regardless of the time that double pole-double throw switch $S_2$ was actuated or set. Further cycles of line current will effectively be blocked through the inherent action of the controlled rectifiers $SCR_1$, $SCR_2$, $SCR_3$, and capacitor $C_4$ until such time as the timing circuitry is reset by switching the switch $S_2$ back to the reset position.

Although the above description of circuit operation was directed to the production of a synchronized shock pulse comprising one complete cycle of the alternating current waveform, it is to be appreciated that, with minor modifications of the above circuit, a suitable synchronized defibrillating shock pulse can be produced which comprises only one half cycle of the alternating current waveform. The full-cycle operation is preferred, however, since this mode of operation tends to maintain transformer $T_2$ in an essentially non-magnetized state whereas a one-half cycle mode of operation might magnetize the core of transformer $T_2$ so as to decrease the efficiency thereof.

After reading the foregoing detailed description, it should be apparent that the objects set forth at the outset of this specification have been successfully achieved by the present invention.

Accordingly, what is claimed is:

1. A method of cardiac defibrillation comprising the steps of:
   forming a defibrillating pulse comprising a single cycle of an alternating current sinusoidal waveform of a duration less than 20 milliseconds commencing at a predetermined point on said alternating current sinusoidal waveform, applying said pulse to a fibrillating cardiac muscle.

2. A method of cardiac defibrillation as defined in claim 1, wherein said alternating current sinusoidal waveform has a frequency of approximately 60 cycles per second and a root mean square voltage of approximately 480 volts.

3. A method of cardiac defibrillation comprising the steps of:
   switching an alternating current of approximately 110 volts and having a frequency of approximately 60 cycles per second on for a period of approximately 20 milliseconds to form a pulse comprising one complete cycle of said alternating current;
   synchronizing said switching with said alternating current such that said complete cycle commences at a time when said alternating current passes through zero;
   increasing the voltage level of said pulse to approximately 480 volts; and
   applying said pulse having said increased voltage level to a fibrillating cardiac muscle.

4. An alternating current defibrillator comprising:
   timing means adapted to be coupled to a source of alternating current, said timing means forming a shock pulse of approximately 20 milliseconds in duration;
   synchronization means associated with said timing means such that said shock pulse comprises a single cycle of said alternating current commencing at a time when said alternating current passes through zero; step-up transformer means for increasing the voltage of said pulse; and electrode means coupled with said step-up transformer means for applying said increased voltage pulse to the body surface of a patient to defibrillate a fibrillating cardiac muscle.

5. An alternating current defibrillator as defined in claim 4, wherein said timing means includes controlled rectifier means coupled between said step-up transformer means and the source of alternating current, and an electronic timing circuit for operating said controlled rectifier means, said controlled rectifier means switching said single cycle of said alternating current to said step-up transformer means.

6. An alternating current defibrillator as defined in claim 5, wherein said electronic timing circuit includes:
   square wave generator means adapted to be coupled to the source of alternating current for producing a train of asymmetric square waves;
   differentiating means for differentiating said train of asymmetric square waves and producing pulses in response thereto, said pulses being delayed in phase with respect to the source of alternating current; and
   triggering means responsive to said pulses for operating said controlled rectifier means in synchronism with the source of alternating current.

7. An alternating current cardiac defibrillator as defined in claim 6, wherein said controlled rectifier means comprises two controlled rectifiers connected in inverse-parallel relationship, each of said two controlled rectifiers including a gate electrode, the gate electrode of one of said two controlled rectifiers being connected to said triggering means, the gate electrode of the other of said two controlled rectifiers being coupled with said step-up transformer means.

8. An alternating current cardiac defibrillator as defined in claim 7, wherein said triggering means includes a third controlled rectifier having a gate electrode, switch means for selectively connecting said gate electrode of said third controlled rectifier to said differentiating means, whereby said third controlled rectifier is made conductive, capacitor means selectively shunted by said switch means and operative when said third controlled rectifier is conductive to pass a single voltage pulse, and means for applying said single voltage pulse to said gate electrode of said one of said two controlled rectifiers.

9. An alternating current cardiac defibrillator comprising:

timing means adapted to be coupled to a source of alternating current for forming a shock pulse having a duration of approximately 20 milliseconds;

said timing means including relay means and an electronic timing circuit for operating said relay means for approximately 20 milliseconds, said electronic timing circuit comprising a transistor amplifier, a timing capacitor operatively associated with said transistor amplifier to enable said transistor amplifier to conduct when said capacitor is charging, and means for charging said capacitor to a level sufficient to cut-off said transistor amplifier in a time period of approximately 20 milliseconds;

step-up transformer means for increasing the voltage of said pulse to approximately 480 volts;

and means for applying said increased voltage pulse to the body surface of a patient to defibrillate a fibrillating cardiac muscle.

10. An alternating current cardiac defibrillator as defibrillator as defined in claim 9, wherein said means for charging said capacitor includes direct current source means, switch means for selectively connecting one plate of said timing capacitor to one pole of said current source means whereby said timing capacitor is charged, and to the other pole of said current source means whereby said timing capacitor is discharged, the other plate of said timing capacitor being coupled with said other pole of said current source means.

11. An alternating current cardiac defibrillator as defined in claim 10, further including a resistor in series with said capacitor, said resistor being adjustable to enable the charging time of said capacitor to be selectively varied.

12. An alternating current cardiac defibrillator as defined in claim 10, wherein said electronic timing circuit further includes a second transistor amplifier operatively connected between said transistor amplifier and said relay means.

References Cited

UNITED STATES PATENTS

| | | | |
|---|---|---|---|
| 3,236,239 | 2/1966 | Berkovits | 128—419 |
| 3,374,443 | 3/1968 | Braun et al. | 328—66 X |

OTHER REFERENCES

Herrod et al.: Annals of Surgery," vol. 136, No. 3, September 1952, pp. 510 and 511.

WILLIAM E. KAMM, Primary Examiner